United States Patent Office 3,238,428
Patented Mar. 1, 1966

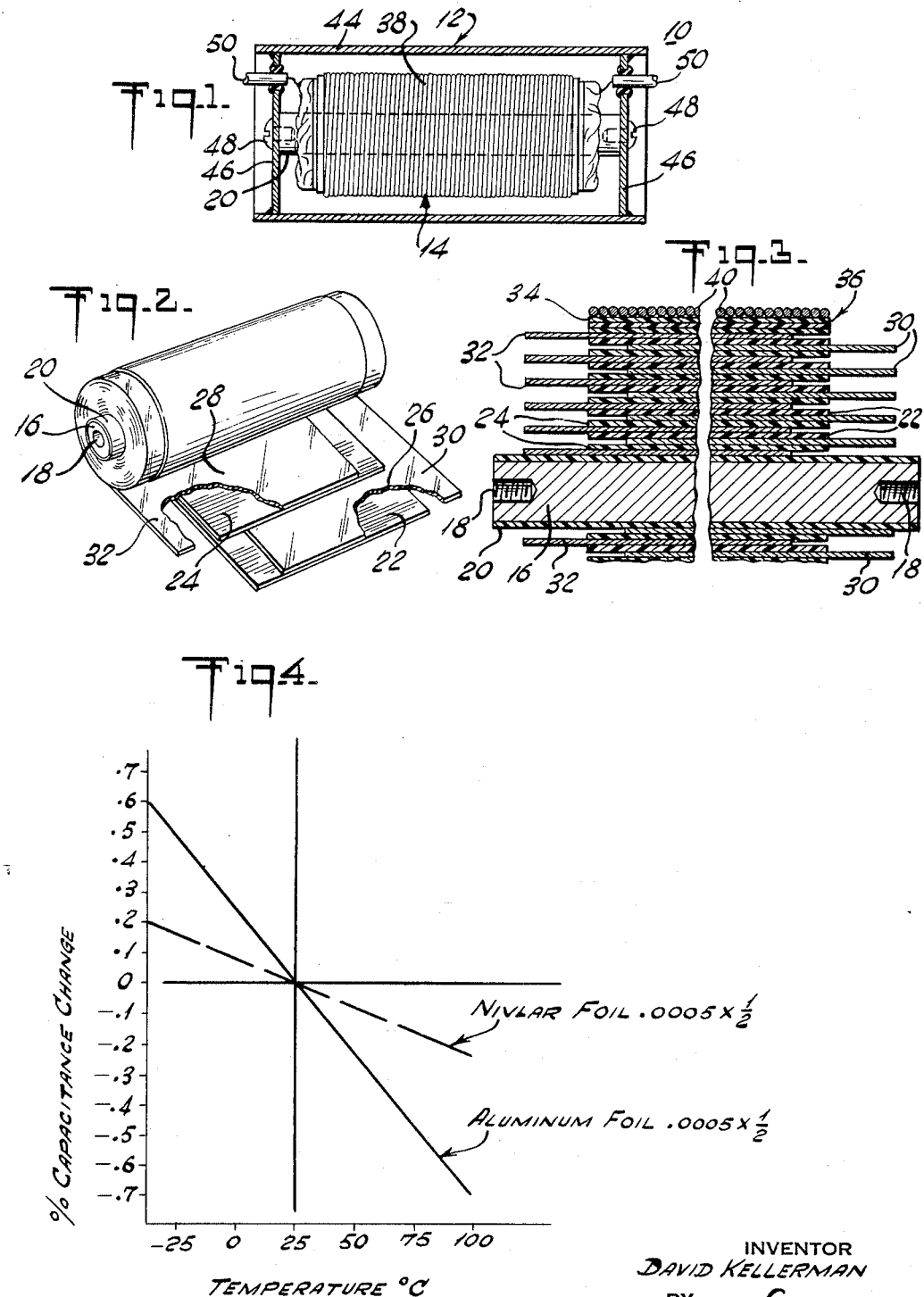

3,238,428
TEMPERATURE COMPENSATED CAPACITOR
David Kellerman, 1444 S. Holt Ave., Los Angeles, Calif.
Filed Apr. 14, 1959, Ser. No. 806,357
9 Claims. (Cl. 317—247)

The present invention relates generally to improvements in electrical components and in particular it relates to an improved electrical capacitor of high stability and having minimum variations with changes in temperature.

With the need and advent of extremely high precision electrical equipment such as in guidance systems, instrumentation, accurate computers of the analogue type and the like, it has become necessary to produce electronic components of high stability, which vary little under different ambient conditions. The conventional electrical capacitors are characterized by their relatively high temperature coeffiecient of capacitance as well as a large capacitance temperature hysteresis. Even the more stable capacitors of the solid dielectric type exhibit a temperature coefficient of expansion of the order of about 1% per 100° C. Moreover, these capacitors possess a very pronounced hysteresis or drift which is generally negative, with the varying of the ambient temperature and the return to the original temperature. As a result, such capacitors cannot be satisfactorily employed in many applications without suitable compensation or close temperature-control of the capacitor. This control or compensation may very often be highly inconvenient if not impossible as a practical proposition.

It is, therefore, a principal object of the present invention to provide an improved electrical component.

Another object of the present invention is to provide an improved electrical capacitor.

Still another object of the present invention is to provide an improved electrical capacitor of great stability.

A further object of the present invention is to provide an improved electrical capacitor having a very low temperature coefficient of capacitance.

Still a further object of the present invention is to provide an improved electrical capacitor possessing a minimum of hysteresis or drift with variations in temperature.

Another object of the present invention is to provide an improved method of producing electrical capacitors of the above nature.

The above and further objects of the present invention will become apparent from a reading of the following description, taken in conjunction with the accompanying drawing, wherein FIGURE 1 is a front elevational view of an electrical capacitor embodying the present invention, the housing thereof being illustrated partially broken away;

FIGURE 2 is a front perspective view of the improved capacitor, per se, illustrated partially disassembled and partially fragmentary;

FIGURE 3 is an enlarged fragmentary longitudinal section view thereof; and

FIGURE 4 is a graph illustrating the variation of capacitance with temperature of a capacitor constructed according to and embodying the present invention, and illustrated in broken line and including a similar graph of a conventional capacitor illustrated in full line.

In a sense, the present invention contemplates the provision of an improved capacitor of the character described, comprising a body member including alternate layers of dielectric and conducting material and a shell under peripheral tension encircling and comprising said body member. Another feature of the present invention resides in the use, for the conducting material, of a metal having a temperature coefficient of expansion of less than $2.0 \times 10^{-6}$ per degree centigrade. In accordance with an improved method of producing the capacitor, the body member thereof is cooled and encircled by a shell at a higher temperature than the body member, the shell and the body member then being brought to substantially the same temperature. The capacitor of the construction as noted and made as described is characterized by its very low temperature coefficient of capacitance and minimum capacitance drift or hysteresis with swinging temperatures.

Referring now to the drawing and particularly to FIGURES 1 through 3 thereof, which illustrate a preferred embodiment of the present invention, reference numeral 10 generally designates the improved capacitor which includes an enclosure or housing 12 within which is mounted the capacitor, per se, indicated by reference numeral 14. The capacitor 14 comprises a cylindrical spool or core member 16 having a pair of opposite tapped axial bores 18 and being formed of any suitable rigid material such as brass or the like. Engaging core member 16 is a sleeve 20 of insulating material which may be formed of an organic plastic sheet wrapped around the core member.

The capacitor electrodes and dielectric separators are helically wound upon the sleeve-carrying core member 16 and include first and second webs or bands 22 and 24 respectively of a flexible or pliable low loss dielectric material, preferably a film of synthetic organic thermoplastic material, such as for example, polytetrafluoroethylene film, the thickness of which depends primarily upon the desired voltage rating of the capacitor. The capacitor electrodes are defined by a pair of first and second metal bands or webs 26 and 28 respectively, the metal employed having, to great advantage, as will be hereinafter set forth, a thermal coefficient expansion not exceeding approximately $2.0 \times 10^{-6}$ per degree centigrade. Examples of metal bands which may be employed are Nilvar or Invar foil having a thickness of, for example, .0005″. The widths of electrodes 26 and 28 are equal to each other and equal to or somewhat greater than the width of dielectric bands 22 and 34, which are likewise of equal width.

First electrode 26 is superimposed upon first dielectric band 22, having one end thereof disposed inwardly of the corresponding edge of the dielectric band 22, and its opposite border extending beyond the respective edge of the first dielectric band 22, see FIGURE 2. Second dielectric band 24 is superimposed upon the first electrode 26 and is in substantial coincidence with first dielectric band 22. Second electrode 28 is in turn superimposed upon the second dielectric band 24 and has a longitudinal border 32 extending laterally beyond the edges of dielectric bands 22 and 24 opposite that of electrode border 30, the opposite edge of the second electrode 28 extending to a line inside the corresponding edge of the second dielectric band 24. The assembled dielectric bands 22 and 24 and electrodes 26 and 28 are tightly spirally wound upon core member 16, the electrode borders 30 and 32 extending laterally beyond opposite edges of the dielectric bands 22 and 24, electrodes 26 and 28 being electrically and physically separated by the interleaved dielectric bands 22 and 24.

A sleeve 34, formed of a plurality of layers of insulating material, encircles the capacitor assembly 36 of the core member electrodes and dielectric bands.

A tubular shell 38 encircles a capacitor assembly 36 and is under peripheral tension to apply a compressive force to the capacitor assembly. The peripheral tension on the shell 38 should exceed approximately one-half pound per linear transverse inch under normal room conditions. Shell 38 is, to great advantage, formed by helically winding a layer of metal wire 40 under a predetermined tension on capacitor assembly 36. The ends of wire 40 are suitably anchored, as by soldering, to adjacent convolutions of the wire, and the successive wire convolutions are preferably wound closely in abutting relationship. The wire 40 may be of copper or other suitable material, which will effect the temperature coefficient of capacitance of the capacitor, which characteristic may be employed to advantage.

While wire 40 is illustrated as being of circular cross-section having a diameter, for example, of .022", wires and tapes of other cross-section and size may be used. Another important benefit gained by the use of a helically wound wire is that the capacitance value may be easily and readily changed merely by varying the number and distribution of the turns by the addition or removal thereof, as required, to achieve the desired capacitance value. This eliminates the conventional costly and tedious method of opening up the winding and peeling back some of the electrode foil in order to obtain a close tolerance in capacitance value.

Casing 12 may be formed of any suitable material and includes a cylindrical wall 44 and end closure walls 46 suitably secured thereto. Capacitor 14 is supported in casing 12 by means of a pair of screws 48 passing through central openings in end walls 46 and engaging the tapped bores of the core member. A pair of insulation covered wire leads 50 are connected respectively to the electrodes 26 and 28 and pass through suitable tight bushings in the casing end walls 46.

An improved method of producing the present capacitor is to construct the capacitor assembly 36 in the usual manner and thereafter cooling the assembly 36 preferably to about 0° C. or less. The wire 40, at about room temperature, that is about 20° C. to 25° C., is then wound upon the cooled assembly 36 and the wire ends anchored. Thereafter, the capacitor is permitted to return to room temperature. As a result, the radial compressive force on the capacitor assembly is increased. It should be noted that in addition the wire may be warmed before winding in which case the assembly 36 need not be precooled.

As aforesaid, capacitors constructed in accordance with the present invention are highly stable, have a controlled and low temperature coefficient of expansion and exhibit a minimum of temperature drift or hysteresis. The differences in the temperature coefficient of capacitance between two identically constructed capacitors, one employing Nilvar foil electrodes and the other aluminum foil electrodes, is illustrated in FIGURE 4 of the drawing. Both capacitors were of the spirally wound type having the same value of about .005 mfd., employed polytetrafluoroethylene film of 0.001" thickness as the dielectric, had an overall length of $1\frac{1}{16}$" and a diameter of $\frac{1}{4}$" and an electrode width of $\frac{1}{2}$". The electrodes were formed of Nilvar and aluminum foil respectively, each of 0.0005" thickness.

It will be seen from the graph of FIGURE 4 that the capacitor employing aluminum electrodes, illustrated by the full line in the graph, has a temperature coefficient of capacitance of more than three times that of the capacitor employing Nilvar electrodes, illustrated in broken line in the graph. Furthermore, when two capacitors differing from each other only in that one was provided with a shell in accordance with the present invention and the other was provided with the conventional shell were subjected to a temperature changing cycle of +25° C., −35° C., +25° C., +100° C. and +25° C., the conventional capacitor exhibited a drift or hysteresis at the conclusion of about 0.1% whereas the capacity of the capacitor of the present invention exhibited a drift or hysteresis of about only 0.02%.

It is believed that the improved characteristics of the present capacitor are achieved by reason of the minimization or elimination of voids, reduction of electrode and capacitance movement with temperature changes and for other reasons.

While there has been described and illustrated a preferred embodiment of the present invention, it is apparent that numerous alterations, omissions and additions may be made without departing from the spirit thereof.

I claim:

1. A capacitor comprising a cylindrical body member of substantially circular transverse cross section and including alternate layers of dielectric and conducting material, and metal wire under tension helically wound upon said body member in successive convolutions which are in substantial side-by-side abutment and which convolutions radially compress said body member.

2. The capacitor of claim 1, wherein said conducting material has a coefficient of expansion of less than $2.0 \times 10^{-6}$ per degree centigrade.

3. A capacitor comprising a cylindrical body member of substantially circular transverse cross section and including alternate layers of dielectric and conducting material, said conducting material having a coefficient of expansion of less than $2.0 \times 10^{-6}$ per degree centigrade, and a cylindrical sheath under peripheral tension tightly engaging and radially compressing said body member.

4. A capacitor structure comprising: a capacitor rolled from alternate strips of conductive foil and dielectric material, wherein the characteristics of said dielectric material contribute to expansion and contraction of said capacitor transversely of the axis thereof in different temperature environments, said capacitor having a characteristic temperature coefficient; and a band surrounding the lateral surface of said capacitor, said band at room temperature snugly engaging said capacitor sufficiently to avoid changing its capacitance at that temperature, said band having a lower temperature coefficient than said capacitor.

5. A capacitor structure comprising: a cylindrical capacitor having a temperature coefficient such that changes in the radial dimension thereof occur at temperatures above and below a predetermined temperature; and a band surrounding said capacitor element, said band firmly embracing said capacitor so as to physically prevent the normal radial expansion thereof, whereby said band and said capacitor form a composite capacitor structure having a lower effective temperature coefficient than that of said capacitor, the engagement of said capacitor by said band being such that the capacitance exhibited by said capacitor alone at said predetermined temperature is maintained.

6. A capacitor structure comprising: a cylindrical foil capacitor formed of convolutions of alternate conductive foil strips and dielectric strips, said dielectric strips being made of a synthetic resin material, said capacitor having a temperature coefficient that helps give the capacitor a characteristic change in radial dimension at temperatures above and below a predetermined temperature; and means for effectively reducing said temperature coefficient including a sleeve snugly disposed around the lateral surface of said capacitor, said sleeve exerting slight radial compressive forces along said capacitor in all temperature environments in a predetermined temperature range above and below said predetermined temperature, said sleeve having a lower temperature coefficient than the temperature coefficient of said capacitor.

7. A capacitor structure comprising: a cylindrical foil capacitor formed of convolutions of alternate conductive foil strips and dielectric strips, said dielectric strips being made of a synthetic resin material, said capacitor having a temperature coefficient that helps give the capacitor a characteristic change in radial dimension at temperatures above and below a predetermined temperature; and means for effectively reducing said temperature coefficient including a sleeve snugly disposed around the lateral surface of said capacitor, said sleeve exerting slight radial compressive forces along said capacitor in all temperature environments in a range that includes said predetermined temperature, said sleeve at said predetermined temperature being stressed against said capacitor, said stress being less than that which would change the normal capacitance of said capacitor at said predetermined temperature.

8. A capacitor structure comprising: a cylindrical foil capacitor formed of convolutions of alternate conductive foil strips and dielectric strips, said dielectric strips being made of a synthetic resin material, said material having a temperature coefficient that helps give the capacitor characteristic changes in radial dimension and capacitance at temperatures above and below a predetermined temperature; and means for effectively reducing said temperature coefficient including a sleeve snugly disposed around the lateral surface of said capacitor, said sleeve exerting slight radial compressive forces along said capacitor in a predetermined range of temperature environments, said sleeve being formed of material having a lower temperature coefficient than said capacitor, said forces being made as great as possible without altering the desired capacitance at room temperature.

9. In combination: a capacitor element having a characteristic temperature coefficient which is manifested by expansion of said element under differing temperature conditions, said capacitor exhibiting a predetermined capacitance at a given temperature; and means for mechanically holding said element to prevent the normal expansion thereof, said means including a strap snugly embracing said capacitor element, said strap having a lower temperature coefficient than said capacitor element, said strap holding said capacitor under a compressive force at said given temperature such that said predetermined capacitance is exhabited by the combination of said capacitor element and said strap.

References Cited by the Examiner
UNITED STATES PATENTS

| | | | |
|---|---|---|---|
| 728,780 | 5/1903 | Splitdorf | 317—260 |
| 942,620 | 12/1909 | Dearlove | 317—261 |
| 1,312,983 | 8/1919 | Heins | 317—260 |
| 1,811,067 | 6/1931 | Valle | 317—260 |
| 2,299,271 | 10/1942 | Godsey | 317—248 |
| 2,304,667 | 12/1942 | Taylor | 317—260 |
| 2,448,887 | 9/1948 | Huckleberry | 317—247 |
| 2,634,315 | 4/1953 | Allison et al. | 317—260 |
| 2,682,626 | 6/1954 | Robinson et al. | 317—260 |
| 2,750,657 | 6/1956 | Herbert | 29—155.5 |
| 3,042,845 | 7/1962 | Rosenberg | 317—260 |

FOREIGN PATENTS

| | | |
|---|---|---|
| 381,494 | 10/1932 | Great Britain. |

ROBERT K. SCHAEFER, *Primary Examiner.*

SAMUEL BERNSTEIN, WALTER L. CARLSON, JOHN F. BURNS, *Examiners.*

A. C. MARMOR, *Assistant Examiner.*